United States Patent Office
3,574,133
Patented Apr. 6, 1971

3,574,133
ENCAPSULATION PROCESS AND ITS PRODUCT
Robert Gordon Bayless, Yellow Springs, and Donald Day Emrick, Kettering, Ohio, assignors to The National Cash Register Company, Dayton, Ohio
No Drawing. Filed Jan. 29, 1968, Ser. No. 701,127
Int. Cl. B01j *13/02;* B44d *1/02;* A61k *9/04*
U.S. Cl. 252—316                                    11 Claims

ABSTRACT OF THE DISCLOSURE

A process is disclosed for producing, en masse, in an aqueous manufacturing vehicle, minute capsules having walls comprising the product of a complexing reaction between poly(vinyl alcohol) and a slowly hydrolyzable alkylene glycol cyclic borate ester to form a non-gelling product. The process utilizes liquid-liquid phase separation in a homogeneous system which is achieved by combination, in solution in the manufacturing vehicle, of the poly(vinyl alcohol) and the cyclic borate ester material.

In the process, complexed poly(vinyl alcohol) and the cyclic borate ester material emerges from solution in the manufacturing vehicle as a separated liquid phase, relatively high in concentration of poly(vinyl alcohol) and dispersed as a discontinuous liquid phase in the manufacting vehicle. The separated liquid phase, when agitated, wets and enwraps dispersed, introduced, particles of intended capsule core entities to produce capsules. Optionally, the produced capsule walls can be chemically treated with solutions of certain transition metal salts to chemically harden the capsule walls and make them self-supporting.

BACKGROUND OF THE INVENTION

Field of the invention

This invention pertains to a process for producing, en masse, in an aqueous manufacturing vehicle, minute, novel, capsules having capsule wall material which comprises modified poly(vinyl alcohol). It more specifically relates to such a process and to the resulting capsule product wherein poly(vinyl alcohol) material, in the capsule wall, is complexed with a water-soluble alkylene glycol cyclic borate ester material and wherein the complexed materials are caused to emerge from solution by addition, to the solution, of a liquid-liquid phase-separation-inducing agent. The liquid-liquid phase separation can be considered to be a result of a coacervation process. It should be understood, then, that in the practice of this invention, individual steps of a complex formation and a liquid-liquid phase separation are both required. Either of the two steps alone is not sufficient to obtain the separated phase useful in this invention.

In work performed prior to the time of this invention, it was found to be difficult to obtain liquid-liquid phase separation of poly(vinyl alcohol) from aqueous solution by the use of boric acid or other similar borate compounds—it having been found that such boron-containing compounds, at an unadjusted solution pH, cause immediate or very rapid "setting" of the entire mass of a poly(vinyl alcohol) solution to yield a rigid or jelly-like, continuous, single-phase mass. The boron-containing compounds utilized in practicing this invention, however, being of a kind different from those utilized in previous work, permit liquid-liquid phase separation of poly(vinyl alcohol) and subsequent production of capsules.

Important aspects of this invention are considered to reside in the discovery that a water soluble complex of poly(vinyl alcohol) material and slowly hydrolyzable alkylene glycol cyclic borate ester material can be caused to undergo liquid-liquid phase separation in an aqueous vehicle—the separated liquid phase being utilized in formation of liquid, embryonic, capsule walls onto introduced particles of material. A further important aspect of the invention resides in the discovery that certain transition metal salts, particularly those of vanadium, can be utilized to further harden this emergent poly(vinyl alcohol)/borate material into firm capsule walls without adversely effecting or redissolving the liquid capsule walls.

Description of the prior art

Encapsulation by means of liquid-liquid phase separation is well known—it being taught, among many other places, in U.S. Pats. Nos. 2,800,457 and 2,800,458, issued July 23, 1957, on the applications of Barrett K. Green and Lowell Schleicher and of Barrett K. Green, respectively, and assigned to the assignee herein. U.S. Pat. No. 2,800,457 teaches encapsulation by what is termed "complex coacervation" wherein at least two hydrophilic polymeric material having opposite net electrical charges are caused to combine or complex from solution in an aqueous liquid manufacturing vehicle to yield an emergent liquid phase having a relatively high concentration of the complexed polymeric materials. The emergent liquid phase is utilized to form capsule walls about particles of intended capsule core material dispersed in the manufacturing vehicle. In this complex coacervation, formation of the complex causes liquid-liquid phase separation because the liquid complex is partially immiscible with the manufacturing vehicle from which it emerged.

U.S. Pat. No. 2,800,458, teaches encapsulation by what is termed "simple coacervation" wherein a hydrophilic polymeric material is caused to emerge from solution, in an aqueous manufacturing vehicle, as a liquid, relatively high in concentration of the polymeric material. The emergent liquid phase is utilized to form capsule walls about particles of intended capsule core material dispersed in the equilibrium manufacturing vehicle. In this simple coacervation, the polymeric material is caused to emerge from solution as a separate liquid phase due to alteration of the manufacturing vehicle by addition of phase-separation-inducing material to make the polymeric material partially immiscible with said vehicle.

U.S. Pat. No. 2,326,539, issued Aug. 10, 1943, on the application of Ernest Irany teaches reaction of poly(vinyl alcohol) and other aliphatic, hydroxy-containing, polymeric materials with boric acid. A principal object of the invention taught by the above Irany patent is to provide finely-divided, free-flowing, thermoplastic resin material. According to the Irany patent, poly(vinyl alcohol) reacts with boric acid to form a complex of borated poly(vinyl alcohol) which, when dried, is completely pulverizable. It is stated therein that boric acid can be removed from the dried, borated, poly(vinyl alcohol) by washing the complex with a solution of acetone and water, thereby obtaining material having the same chemical composition as that of the originally used poly(vinyl alcohol). The intended reaction product of the above Irany patent is a brittle, pulverizable, resin material; the boron-containing reactant is boric acid, and there is no indication in the Irany patent that a separated liquid phase or a fluid gel can be produced by the reaction of poly(vinyl alcohol) with boric acid.

U.S. Pat. No. 3,324,065, issued June 6, 1967, on the application of Andrew Pierce teaches reaction, in an aqueous medium, of poly(vinyl alcohol) with water-soluble boron compounds—boric acid being preferred. The reaction product of the above Pierce invention forms a single-phase, tacky, liquid which is used as an adhesive material having improved adhesive characteristics over other poly(vinyl alcohol)-containing adhesive material. The adhesive material disclosed includes a non-boron containing "water soluble gelation retarder," and there is no indication that a liquid-liquid phase separation would be possible, evn if such phase-separation were desirable.

"Some Aspects of Hydrocolloid Gelation" by R. E. Schachat and L. Z. Raymond in Advances in Chemistry Series, No. 25 (Physical Functions of Hydrocolloids), pages 11–24, published 1960 by American Chemical Society, describes gelation of aqueous solutions of poly(vinyl alcohol) by materials such as borax and boric acid, but there is no teaching of liquid-liquid phase separation of a poly(vinyl alcohol)/borate complex from the aqueous poly(vinyl alcohol) solutions.

U.S. Pat. No. 3,067,192, issued Dec. 4, 1962, on the application of Donald D. Emrick, one of the inventors herein, teaches a method for preparation of organic-liquid soluble borates of polysaccharides having two adjacent cis-hydroxyl groups. Such borated polysaccharides are intended for use as motor oil additives and there is no indication in the U.S. Pat. No. 3,067,192 of their use as gelling or complexing agents for poly(vinyl alcohol) in aqueous solution. A reason for referencing the above Emrick patent herein is that the patent discloses alkylene glycol cyclic borate esters of the same general type utilized in practice of the instant invention. Methods for preparing alkylene glycol cyclic borate esters or their monohydric alcohol derivatives are not considered to be a part of the instant invention; nor are the alkylene glycol cyclic borate esters themselves.

U.S. Pats. Nos. 3,258,422, issued June 28, 1966; 3,264,-245, issued Aug. 2, 1966; and 3,265,657, issued Aug. 9, 1966, all on the applications of Harold Sinclair, teach formation of a rigid gel from a solution of poly(vinyl alcohol) by treatment of the poly(vinyl alcohol) with metallic ions, such as vanadium, titanium, or chromium. The rigid gels formed by the above Sinclair inventions are of a gross nature, that is, an entire, continuous, mass of poly(vinyl alcohol) solution is homogeneously, rigidly, gelled as a single phase.

Although not prior art, U.S. patent application Ser. No. 701,130, filed Jan. 29, 1968, on the same day herewith in the names of Robert G. Bayless and Donald D. Emrick, the same inventors as the inventors herein, and assigned to the assignee herein, teaches a method for preparing capsules having walls which include poly(vinyl alcohol) which has been complexed with an alkylene glycol cyclic borate ester. The complexing reaction, however, is performed at an interface between a particle of capsule internal phase and an aqueous liquid manufacturing vehicle in which the poly(vinyl alcohol) is dissolved. Moreover, preferred types of cyclic borate ester materials used in practicing that invention are different from the preferred types utilized in practice of the present invention.

SUMMARY OF THE INVENTION

In past attempts to encapsulate materials in a liquid vehicle, by liquid-liquid phase separation of poly(vinyl alcohol)-containing material, it had been found to be difficult to obtain an emergent liquid phase having the physical properties required or desired for encapsulation. While the prior art teaches several methods for gelling solutions of poly(vinyl alcohol), there is no teaching in the art related to preparation of separated liquid phases, which are relatively high in concentration of poly(vinyl alcohol) and which have emerged from liquid vehicles.

The term "poly(vinyl alcohol)," as used herein, is to be understood as referring to polymeric material in which at least 50 percent, by weight, thereof is composed of vinyl alcohol constituent. The term refers to polymeric materials all of which include vinyl alcohol constituents and also to polymeric material containing not only vinyl alcohol constituents but also vinyl acetate (and/or propionate and/or butyrate) constituents providing that the vinyl alcohol constituents make up at least 50 percent, by weight, of the polymeric material. The poly(vinyl alcohol) most often used in practice of this invention is any commercial variety and, up to this time, is the hydrolysis product of poly(vinyl acetate).

Poly(vinyl alcohol) representing poly(vinyl acetate) which has been hydrolyzed to an extent of 75 to 99 or more percent, by weight, is preferably used, although poly(vinyl alcohol) having a lower degree of hydrolysis can be used.

Poly(vinyl alcohol), being a synthetic, water soluble, relatively inexpensive, polymeric material, has several attributes which serve to recommend it as a satisfactory, in fact improved, substitute for other hydrophilic capsule wall materials, particularly natural ones, which have been used in the past. The physical characteristics of synthetic polymeric materials can be well controlled as to molecular weight, solubility in various solvents, solution viscosity, etc., during the manufacturing process. On the other hand, naturally occurring hydrophilic polymeric materials, such as gelatin, are subject to change more or less according to such difficult-to-control factors as: variations in climate where the animal or plant sources for such materials are grown; time of year when the polymeric material is produced; slight changes in type, species, or health of the animal or plant source, etc. Such slight variations in the characteristics of naturally occurring polymeric materials, require that modifications be made, from time to time, in encapsulation processes which utilize such materials, in order to maintain a high and consistent standard of product quality. Modification of a process so sensitive to variations in manufacturing conditions as that of encapsulation is an expensive and time-consuming task.

Permeability characteristics of films made from poly(vinyl alcohol)-containing materials with respect to liquid and gas diffusion or permeation through the films are ideal for certain uses to which the capsules of this invention are to be put. Also, poly(vinyl alcohol)—being a hydrophilic polymeric material—shares with other hydrophilic polymeric capsule wall materials, substantial insolubility in common "oily" organic solvents.

The novel process provides capsules which exhibit very little inter-capsule adhesion during final manufacturing steps of capsule wall drying. It is, therefore, believed that the novel process greatly simplifies the heretofore rather complex and expensive capsule manufacturing steps of isolating the capsules from a manufacturing vehicle and drying the capsule walls.

An object of this invention is to provide a process for preparing, en masse, from a liquid manufacturing vehicle, minute capsules having poly(vinyl alcohol) as one component of the capsule walls. A further object of this invention is to provide a capsule made by the above process wherein the capsule wall material comprises a complex combination of materials derived from poly(vinyl alcohol) and an alkylene glycol cyclic borate ester wherein the alkylene glycol portion of said cyclic borate ester is a 1,3- or 2,4-dihydroxy substituted glycol.

A further and more specific object of this invention is to provide such an encapsulating process wherein a complex of poly(vinyl alcohol) and alkylene glycol cyclic borate ester material is caused to emerge from solution, as a separate liquid phase, in an aqueous manufacturing vehicle, to form liquid capsule walls about intended capsule internal phase particles dispersed in the manufacturing vehicle which vehicle serves as a dispersing medium.

The novel process of this invention, stated broadly, can includes the steps of: (a) establishing an agitating, aqueous liquid system including poly(vinyl alcohol), alkylene glycol cyclic borate ester, and phase-separation-inducing material in an aqueous vehicle wherein a first phase is formed of intended capsule wall material—poly(vinyl alcohol)/alkylene glycol cyclic borate ester complex—and a second phase is the aqueous liquid vehicle; (b) adding to the system, once established, intended capsule core material, substantially insoluble in the system; which core material, when dispersed as particles (capsule core entities), is wet and enwrapped by the first phase of intended capsule wall material to form liquid-walled capsules dispersed in the second phase; (c) then, adding to the system, an aqueous salt solution to cause partial dehydration and increase in viscosity of the capsule wall material; and, optionally, (d) treating the capsules by an aqueous solution of a transition metal salt to cross-link the poly(vinyl alcohol)/borate complex and render it more water insoluble.

With the foregoing discussion and objects of the invention in mind, the invention will now be explained and exemplified in detail, from which detailed explanation and the appended claims, further objects and features of the invention will become apparent to those skilled in the art to which this invention pertains.

Material contained by capsule walls of this invention, i.e., the selected capsular internal phase or core material, is relatively unimportant to the practice of this invention and can be any material which is substantially water insoluble and which does not interact with the intended capsule wall material or with other encapsulating-system components to the detriment of the novel process. A few of the materials which can be utilized as capsule internal phases include, among a multitude of others: water insoluble or substantially water insoluble liquids, such as olive oil, fish oils, vegetable oils, sperm oil, mineral oil, xylene, benzene, toluene, kerosene, chlorinated biphenyl and methyl salicylate; water insoluble metallic oxides and salts; fibrous materials, such as cellulose or asbestos; water insoluble synthetic polymeric materials; minerals; pigments; glasses; elemental materials including solids, liquids and gases; flavors; fragrances; reactants; biocidal compositions; physiological compositions; fertilizer compositions; and the like. The capsule product of this invention finds particular utility in containing organic liquid solutions of phthalide-types and other types of latent, uncolored, dyes, such as 3,3-bis(4-dimethyl-aminophenyl)-6-dimethylaminophthalide (commonly known as crystal violet lactone), in their uncolored state—the combination of materials in the encapsulating system of this invention being substantially unreactive with these types of dye materials.

The present invention utilizes, as material for capsule wall manufacture, a complex of poly(vinyl alcohol) and water-soluble alkylene glycol cyclic borate ester compounds, which borate ester compounds permit liquid-liquid phase separation of the complex from an aqueous manufacturing vehicle.

The boron-containing compound is an alkylene glycol cyclic borate ester prepared by reaction of an alkylene glycol with boric acid or a borate, e.g.,

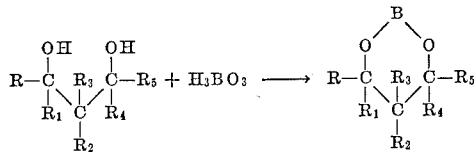

wherein R, $R_1$, $R_2$, $R_3$, $R_4$, and $R_5$ can be either hydrogen atoms or alkyl groups having from one to two carbon atoms and, further, one and preferably two of the above R groups are alkyl groups. For use in this invention, the alkylene glycol is chosen so that the alkylene glycol cyclic borate ester will be water soluble and so that the boron-containing ring will have six members. It is well-known that six-membered rings provide a degree of stability against ring cleavage and are, therefore, chosen for use herein to provide a cyclic borate ester material which is difficultly hydrolyzable. It is apparent that the alkylene glycol cyclic borate ester material is capable of complexing with only one hydroxyl group from a poly(vinyl alcohol) molecule and that cross-linking will, therefore, not occur—at least for a long time, and thus gelling will not occur to interfere with capsule wall formation. The un-cross-linked complexing reaction product of poly(vinyl alcohol) with the cyclic borate ester material is used in the liquid-liquid phase separation system and, subsequently becomes part of the capsule wall material of this invention.

The above-discussed eligible type of alkylene glycol cyclic borate esters is used in practice of this invention. Various types of cyclic borate esters differ as to amount of boron-containing constituent and the manner in which it is included in the borate ester molecules. Discussion of the variety of borate ester types can be facilitated by use of numerical ratios such as 1:1, 2:2, 3:2, etc., to indicate the ratio of glycol groups to boron constituents in a borate ester molecule.

Although not fully understood, it is believed that alkylene glycol cyclic borate esters having a ratio different from 1:1 must undergo some degree of hydrolysis with the aqueous manufacturing vehicle to produce 1:1 cyclic borate ester prior to formation of a complex combination of the ester with poly(vinyl alcohol).

In the practice of the present invention, it has been found that the 1:1 type of water-soluble cyclic borate ester yields more favorable results than do other types of the cyclic borate esters. The previously-identified United States patent application Ser. No. 701,130, filed Jan. 29, 1968, relates to capsule manufacture by interfacial complex formation and, in the practice of that invention, it was found that types of cyclic borate esters other than 1:1 glycol to boron constituent were preferable to provide capsules of good quality.

The complex combination of materials which is produced by the action of the alkylene glycol cyclic borate ester on poly(vinyl alcohol) is caused to emerge from solution as a liquid phase by addition, to the system, of a phase-separation-inducing agent. Phase-separation-inducing agents are usually either water-soluble polymeric materials, such as gum arabic or certain high molecular-weight polysaccharides or water soluble, inorganic salts such as ammonium sulfate, sodium sulfate or magnesium sulfate. A combination of phase-separation-inducing agents can, of course, be utilized. Frequently, the initial complex formation is accomplished in the presence of phase-separation-inducing agents already in solution in the manufacturing vehicle, thus, in such a case, liquid-liquid phase separation occurs nearly as rapidly as the complex is formed. Another frequently practiced, alternative, method for capsule wall formation according to the teaching of this invention utilizes a water-soluble polymeric material as the agent for initial phase separation and a salt as an agent to complement and further accomplish phase separation and begin capsule wall material dehydration and hardening. The resulting separated liquid phase is a solution relatively rich in poly(vinyl alcohol) component and readily wets and enwraps particles of intended capsule internal phase which have been dispersed in the system. Although not entirely understood and not necessary to the practice of the present invention, it is believed that the alkylene glycol cyclic borate ester present by its being complexed with the poly(vinyl alcohol) may begin to be hydrolyzed into boric acid and alkylene glycol and, thereby, form a relatively rigid, cross-linked, poly(vinyl alcohol)/boric acid gel—the degree and rate of this rigidization increasing with increase in pH above about 4. Thus, the capsules originally formed may be caused to "self-harden" by the delayed hydrolysis reaction which may occur or may be caused to occur after capsule wall formation. The hydrolysis reaction can be controlled, to some degree, by careful adjustment of such factors as temperature of the system, pH of the manufacturing vehicle, concentration of the poly(vinyl alcohol) and cyclic borate ester materials in the system, and relative amounts of poly(vinyl alcohol) to borate ester material in the system. Of course, the type of alkylene glycol used in preparing the water-soluble borate ester also bears a relation to the rapidity of hydrolysis and, therefore, to the rapidity and degree of rigidification of the poly(vinyl alcohol)- containing capsule walls. The more alkyl branching or "buttressing" chemical groups adjacent to the six-membered ring structure of the cyclic borate ester, the more stable will be the cyclic borate structure to hydrolysis. The alkylene glycols used in manufacture of the above cyclic borate esters are 1,3- or 2,4-dihydroxy substituted beta-glycols having at least one alkyl branch and a total of at least 5 carbon atoms.

If it is desired or required that the capsule walls be hardened to a rigid state, they can be treated by an aqueous solution of vanadyl sulfate or other transition metal salt by adding an aqueous solution of the salt to the agitating system of capsules in the manufacturing vehicle and then adjusting the pH of the manufacturing vehicle to yield optimum conditions for chemical reaction between the poly(vinyl alcohol) and the transition metal ions. The above method for treating capsule wall materials which comprises reacting poly(vinyl alcohol) with a salt of a transition metal such as vanadium is not considered to be a part of the invention herein—it being taught in U.S. patent application Ser. No. 701,129, filed on the same date herewith in the name of Donald D. Emrick, and assigned to the assignee herein. The above Emrick patent application is a continuation-in-part of U.S. patent application Ser. No. 586,943, filed Oct. 17, 1966. After the above chemical reaction, which chemically hardens the capsule walls, the capsules can be separated from the manufacturing vehicle by filtering, washed with water, and the capsule walls dried by placing the capsules in a forced air dryer.

It should be understood that the capsules need not have dried walls or even be separated from a liquid vehicle prior to their use. If it is desired or required for some intended purpose, the capsule product of this invention can be supplied as a slurry of capsules in a liquid carrier, either the manufacturing vehicle or not, as for use in a paper-coating composition, a paint, an insecticide composition, or the like—such uses being well-known and obvious to persons skilled in the pertinent arts.

Individual capsules prepared by the present invention are substantially spherical and can be manufactured in sizes from about 1 micron in diameter to about 5000 microns in diameter—the preferred size range being from about 2 to about 1000 microns in diameter. The capsule product of this invention can be made to take the form either of individual capsules with each entity having, as an internal phase, one particle of capsule core material or of aggregates of individual capsules with each aggregate entity having several particles of capsule core material. Capsule aggregates can be made in sizes from a few microns to several thousand microns in diameter depending upon the size and number of individual capsule core particles included in each aggregate.

DESCRIPTION OF THE PREFERRED EMBODIMENTS

Example 1

In this example a 1:1-type of alkylene glycol cyclic borate ester was prepared in-situ in the manufacturing vehicle prior to addition of other components of the encapsulating process. This example demonstrates preparation of capsules by formation of a liquid phase rich in poly(vinyl alcohol)/cyclic borate ester complex by liquid-liquid phase separation from solution in a manufacturing vehicle.

Into a vessel having a capacity of approximately 1500 milliliters and equipped for agitation were placed 100 milliliters of water, 9.9 grams of 2-methyl-2,4-pentanediol (sometimes named hexylene glycol), and 5.2 grams of ortho-boric acid powder. The mixture was agitated until the boric acid was dissolved—about 15 minutes—which indicated substantial reaction of the boric acid with the glycol to yield 1:1-type of (2-methyl-2,4-pentanediol) borate. To this solution of cyclic borate ester, were then added 50 milliliters of trichlorobiphenyl—the liquid capsule internal phase material for this example—10 grams of urea to serve as an anti-aggregation agent, 200 milliliters of 11 percent, by weight, aqueous gum arabic solution and 150 milliliters of poly(vinyl alcohol) solution. The poly(vinyl alcohol) solution was prepared as follows: 1.5 grams of about 86,000-molecular weight poly(vinyl alcohol) characterized by having a viscosity of about 28 to about 32 centipoises in a 4 percent, by weight, aqueous solution at 20 degrees centigrade, and by being 99 to 100 percent hydrolyzed (such as the material designated as "Elvanol 71–30" sold by E. I. du Pont de Nemours and Co., Wilmington, Del., U.S.A.) and 6 grams of about 125,000-molecular weight poly(vinyl alcohol) characterized by having a viscosity of about 35 to about 45 centipoises in a 4 percent, by weight, aqueous solution at 20 degrees centigrade and by being 87 to 89 percent hydrolyzed (such as the material designated as "Elvanol 50–42" sold by E. I. du Pont de Nemours and Co., Wilmington, Del., U.S.A.) were dissolved in enough hot water to make a total volume of 150 milliliters of solution. The agitation was adjusted to produce particles of the capsule internal phase material approximately 500 microns in diameter. At this point in the example, the dispersed particles had acquired liquid capsule walls of poly(vinyl alcohol)/cyclic borate ester complex—the liquid-liquid phase separation having had occurred at the time that the poly(vinyl alcohol) solution was added to the agitating system.

After continuing agitation for approximately 5 minutes, 160 milliliters of 15 percent, by weight, aqueous sodium sulfate solution was added to the system in a dropwise fashion over a duration of 15 to 20 minutes. The sodium sulfate solution caused the liquid capsule walls to shrink. Finally, 100 milliliters of an aqueous salt solution having a pH of 3.9 to 4.0 and containing 7.5 grams of sodium sulfate and 5 grams of vanadyl sulfate dihydrate were added to the system of dispersed capsules and the pH of the manufacturing vehicle was then adjusted to about 4.5 to cause chemical cross-linking of the poly(vinyl alcohol) with vanadyl ions in the solution. The capsules, now with solid, hardened, walls were separated from the manufacturing vehicle by filtration, washed with cold water and spread on an absorbent surface to dry in the laboratory environment. The capsule product consisted of free-flowing and apparently dry, individual capsules which yielded trichlorobiphenyl when ruptured.

EXAMPLE 2

In this example, a 1:1-type of alkylene glycol cyclic borate ester was prepared, in the manufacturing vehicle from a 2:2-type of cyclic borate ester starting material.

Into a vessel having a capacity of approximately 1500 milliliters and equipped for agitation and heating were placed 100 milliliters of water, 40 milliliters of 14 percent, by weight, aqueous acetic acid, 400 millileters of 11 percent, by weight, aqueous gum arabic solution, 20 grams of urea to serve as an anti-aggregation agent, 300 milliliters of aqueous poly(vinyl alcohol) solution having the kinds and concentrations of poly(vinyl alcohol) as were in the poly(vinyl alcohol) solution of Example 1, and 20 milliliters of bis(2-methyl-2,4-pentanediol) diborate. The mixture was agitated and heated to about 55 degrees centigrade for a few minutes during which time a very viscous liquid phase of poly(vinyl alcohol)/borate complex separated from the manufacturing vehicle. Agitation in the mixture was continued and the system was allowed to cool to about 25 degrees centigrade, over a duration of about 30 minutes at which time the liquid-separated phase appeared to be fluid and of a viscosity acceptable for manufacturing capsules. Again, although not necessary to practice of this invention, it is believed that, during the course of the above heating and cooling steps, the 2:2 anhydride cyclic borate ester became completely hydrolyzed to the 1:1 cyclic borate ester and the complex approached an equilibrium with the manufacturing vehicle with regard to solubilities of the complex and of individual components. The above, fluid, separated phase can be obtained without heating the system by permitting the system to agitate for several hours. One-hundred milliliters of toluene—the capsule internal phase for this example—was added to the encapsulating system, once established. The agitation was adjusted to yield dispersed particles of capsule internal phase having diameters of about 500 to 1000 microns and the agitation was continued for about 1.5 hours during which time the separated liquid phase wet and wrapped the particles to form liquid-walled capsules. Next, in order to shrink and partially dehydrate the liquid capsule walls, 160 milliliters of 15 percent, by weight, aqueous solution of sodium sulfate was added to the system in a dropwise fashion over a duration of about 40 minutes. A solution of 10 grams of vanadyl sulfate dihydrate in 200 milliliters of 7.5 percent, by weight, aqueous sodium sulfate solution was added over a 20 minute duration, immediately followed by an amount of concentrated aqueous ammonia solution to adjust the pH of the system to 4.0 in order to provide optimum conditions for cross-linking the poly(vinyl alcohol)-containing capsule wall material with vanadyl ions. The system of now solid-walled capsules dispersed in manufacturing vehicle was agitated for an additional 25 minutes and chilled to about 10 degrees centigrade. The capsules were separated from the manufacturing vehicle by filtering, where washed with 600 milliliters of cold water, and the capsule walls were dried by placing the capsules in a forced air dryer. The capsule product of this example was much like that of Example 1 in appearance. Of course, the capsules yielded toluene instead of trichlorobiphenyl when they were ruptured.

EXAMPLE 3

The above Example 2 was repeated with regard to procedure and to kinds and amounts of materials, with the exception that dioctyl phthalate was substituted for the toluene of Example 2, as capsule internal phase. The capsule product of this example was substantially identical in appearance with that of Example 2.

EXAMPLE 4

The above Example 2 was repeated with regard to procedure and to kinds and amounts of materials with the exception that xylene was substituted for the toluene of Example 2, as capsule internal phase. The capsule product of this example was substantially identical in appearance with that of Example 2.

EXAMPLE 5

In this example, a 1:1-type of alkylene glycol cyclic borate ester was prepared in methanol and the resulting methanolic derivative was added to the encapsulating system to complex with poly(vinyl alcohol) to form capsule wall material.

The capsule internal phase for this example was a solution of 1 percent, by weight, each, of two solid materials—crystal violet lactone and benzoyl-leuco-methylene blue—dissolved in a 2:1, by weight, ratio of trichlorobiphenyl and a hydrocarbon oil sold as "Dispersol-81515" by the Shell Chemical Company, New York, N.Y., U.S.A. and having the following characteristics: 1 percent, by volume, aromatics; 50 percent, by volume, naphthenes; and 49 percent, by volume, paraffins; distillation range—199 to 258 degrees centigrade; and Kauri-Butanol number equal to 29.2 according to ASTM testing procedure D–1133.

The methanolic derivative of the alkylene glycol cyclic borate ester was prepared by dissolving 9.4 grams of ortho-boric acid and 18 milliliters of 2-methyl-2,4-pentanediol (commonly known as hexylene glycol) in 80 milliliters of methanol.

Into a Waring Blendor cup having a capacity of approximately one liter were placed 75 milliliters of 5 percent, by weight, aqueous poly(vinyl alcohol) solution wherein the poly(vinyl alcohol) had a molecular weight of about 86,000 and was further characterized by having a viscosity of about 28 to about 32 centipoises in a 4 percent, by weight, aqueous solution at 20 degrees centigrade, and by being 99 to 100 percent hydrolyzed (such as the material designated as "Elvanol 71–30" sold by E. I. du Pont de Nemours and Co., Wilmington, Del., U.S.A.) and 35 milliliters of the above-described capsule internal phase material. The Blendor was operated to produce an emulsion of capsule internal phase particles having diameters of about 2 to about 4 microns in a continuous liquid of poly(vinyl alcohol) solution. While maintaining agitation of the system, a mixture of 100 milliliters of 11 percent, by weight, aqueous gum arabic solution, 50 milliliters of 15 percent, by weight, aqueous sodium sulfate solution, 5 grams of urea to serve as anti-aggregation agent, and 23 milliliters of the above-described methanolic alkylene glycol cyclic borate ester derivative were rapidly added to the Blendor cup. Agitation was continued for an additional 10 minutes to permit liquid-liquid phase separation of the poly(vinyl alcohol)/borate complex and subsequent formation of liquid capsule walls and then a solution of 2.5 grams of vanadyl sulfate dihydrate in 50 milliliters of 1.5 percent, by weight, aqueous sodium sulfate solution having an adjusted pH of 4.2 was added to the Blendor cup to harden the capsule walls by cross-linking the poly(vinyl alcohol) with vanadyl ions. After about 4 minutes, the pH of the agitating system was adjusted to approximately 4.1 and after an additional 6 minutes the capsules were completed and were ready for use. The capsule product of this example consisted of an aqueous slurry of individual capsules and aggregates of small numbers of individual capsules—the capsule and capsule aggregate diameter being about 3 to 20 microns. The capsule-slurry product of this example was intended to be used as a paper-coating composition wherein a sheet or web would be coated with the slurry and then the liquid of the slurry would be removed to yield a sheet or web coated or impregnated with apparently dry capsules which release a contained material when ruptured.

The capsule products of all of the above examples in which the capsule walls have been reacted with transition metal ions, can be utilized in practice of an invention which is the subject of United States patent application Ser. No. 701,126, filed on the same date herewith in the name of Donald D. Emrick, one of the inventors herein, and assigned to the assignee herein, wherein it is taught that capsules whose walls have been treated with transition metal ions can be further treated by generation of polymeric material grafted to the capsule wall material at the sites of the transition metal ions which results in growth of polymeric material interstitially within molecular units of the capsule wall material.

What is claimed is:
1. A process for producing minute capsules, en masse, comprising the steps of:
 (a) establishing an agitated system having a continuous phase of an aqueous liquid solution of a complex combination of poly(vinyl alcohol) and an alkylene glycol cyclic borate ester wherein the alkylene glycol cyclic borate ester is a product of reaction between boric acid or a borate and at least one alkylene glycol selected from the group consisting of 1,3-glycols having at least one alkyl branch and a total of at least 5 carbon atoms and 2,4-glycols having at least one alkyl branch and a total of at least 5 carbon atoms; and a discontinuous phase of dispersed, substantially water-insoluble, intended capsule core entities; and
 (b) adding to the agitated system a water-soluble liquid-liquid phase separation inducing material to cause a solution of the complex of poly(vinyl alcohol) and alkylene glycol cyclic borate ester to emerge as a separate liquid phase to wet and enwrap the capsule core entities to form capsules.
2. The capsule product of claim 1.

3. The process of claim 1 wherein the alkylene glycol cyclic borate ester is a reaction product of a reaction between boric acid and at least one glycol taken from the group consisting of 1,3-dihydroxy substituted beta-glycol having at least one alkyl branch and a total of at least 5 carbon atoms and 2,4-dihydroxy-substituted beta-glycol having at least one alkyl branch and a total of at least 5 carbon atoms.

4. A process for producing minute capsules, en masse, comprising the steps of:
(a) reacting in an aqueous liquid system, an alkylene glycol cyclic borate ester material wherein the alkylene glycol cyclic borate ester is a product of reaction between boric acid or a borate and at least one alkylene glycol selected from the group consisting of 1,3-glycols having at least one alkyl branch and a total of at least 5 carbon atoms and 2,4-glycols having at least one alkyl branch and a total of at least 5 carbon atoms; with poly(vinyl alcohol) material to yield a water-soluble capsule-wall-forming complex of the materials;
(b) adding, to the aqueous liquid system, a water-soluble liquid-liquid phase-separation-inducing agent to cause emergence, from solution, of a separated liquid phase relatively rich in the capsule-wall-forming complex of materials;
(c) dispersing, by agitation, in the aqueous liquid system, particles of substantially water-insoluble intended capsule core entities to be wet and wrapped by the capsule-wall forming complex of materials to yield capsules.

5. The process of claim 4 wherein the alkylene glycol cyclic borate ester is a reaction product of a reaction between boric acid and at least one glycol taken from the group consisting of 1,3-dihydroxy substituted beta-glycol having at least one alkyl branch and a total of at least 5 carbon atoms and 2,4-dihydroxy substituted beta-glycol having at least one alkyl branch and a total of at least 5 carbon atoms.

6. A process for producing minute capsules, en masse, comprising the steps of:
(a) establishing an agitated two-phase system having a continuous phase of an aqueous liquid solution of poly(vinyl alcohol) and a discontinuous phase of dispersed, substantially water-insoluble, intended capsule core entities;
(b) reacting the dissolved poly(vinyl alcohol) with alkylene glycol borate ester wherein the alkylene glycol borate ester is a product of reaction between boric acid or a borate and at least one alkylene glycol selected from the group consisting of 1,3-glycols having at least one alkyl branch and a total of at least 5 carbon atoms and 2,4-glycols having at least one alkyl branch and a total of at least 5 carbon atoms; to provide a complex combination of poly(vinyl alcohol) and alkylene glycol borate ester in solution in the continuous aqueous phase; and
(c) adding to the agitated system a water-soluble liquid-liquid phase-separation-inducing agent to cause a solution of the complex to emerge as a separate liquid phase to wet and wrap the capsule core entities to form capsules.

7. The process of claim 6 wherein the alkylene glycol cyclic borate ester is a reaction product of a reaction between boric acid and at least one glycol taken from the group consisting of 1,3-dihydroxy substituted beta-glycol having at least one alkyl branch and a total of at least 5 carbon atoms and 2,4-dihydroxy substituted beta-glycol having at least one alkyl branch and a total of at least 5 carbon atoms.

8. An agitating three-phase system consisting essentially of a continuous first phase of an aqueous liquid manufacturing vehicle having dissolved therein a water-soluble liquid-liquid phase-separation-inducing agent and having dispersed therein a discontinuous second phase of a capsule wall-forming solution of a complex combination of poly(vinyl alcohol) and alkylene glycol cyclic borate ester wherein the alkylene glycol cyclic borate ester is a product of reaction between boric acid or a borate and at least one alkylene glycol selected from the group consisting of 1,3-glycols having at least one alkyl branch and a total of at least 5 carbon atoms and 2,4-glycols having at least one alkyl branch and a total of at least 5 carbon atoms; and a discontinuous third phase of substantially water-insoluble intended capsule core entities wherein the continuous first phase serves as a dispersing medium for the discontinuous second phase which wets and wraps the discontinuous third phase of capsule core entities to form capsules.

9. The system of claim 8 wherein the alkylene glycol cyclic borate ester is a reaction product of a reaction between boric acid and at least one glycol taken from the group consisting of 1,3-dihydroxy substituted beta-glycol having at least one alkyl branch and a total of at least 5 carbon atoms and 2,4-dihydroxy substituted beta-glycol having at least one alkyl branch and a total of at least 5 carbon atoms.

10. In a process for manufacturing minute capsules, en masse, comprising the steps of establishing an agitated two-phase system having a continuous phase of an aqueous liquid solution of a complex combination of polymeric material and a complexing-agent material and a discontinuous phase of dispersed, substantially water-insoluble intended capsule core entities, and adding to the agitated system a water-soluble liquid-liquid phase-separation-inducing material to cause polymer rich solution of the complex combination of materials to emerge as a separate liquid phase to wet and wrap the capsule core entities to form capsules; the improvement wherein the polymeric material is poly(vinyl alcohol) and the complexing agent is a product of reaction between boric acid or a borate and at least one alkylene glycol selected from the group consisting of 1,3-glycols having at least one alkyl branch and a total of at least 5 carbon atoms and 2,4-glycols having at least one alkyl branch and a total of at least 5 carbon atoms.

11. The process of claim 10 wherein the complexing agent is a reaction product of a reaction between boric acid and at least one glycol taken from the group consisting of 1,3-dihydroxy substituted beta-glycol having at least one alkyl branch and a total of at least 5 carbon atoms and 2,4-dihydroxy substituted beta-glycol having at least one alkyl branch and a total of at least 5 carbon atoms.

References Cited
UNITED STATES PATENTS

| | | | |
|---|---|---|---|
| 2,741,548 | 4/1956 | Darling et al. | 44—69 |
| 2,753,288 | 7/1956 | Visscher | 424—33X |
| 2,800,457 | 7/1957 | Green et al. | 252—316 |
| 2,993,837 | 7/1961 | Millar et al. | 424—33 |

RICHARD D. LOVERING, Primary Examiner

U.S. Cl. X.R.

71—64; 99—166; 106—308; 117—36.2, 100; 260—29.6; 264—4; 424—33, 34